Patented Apr. 3, 1951

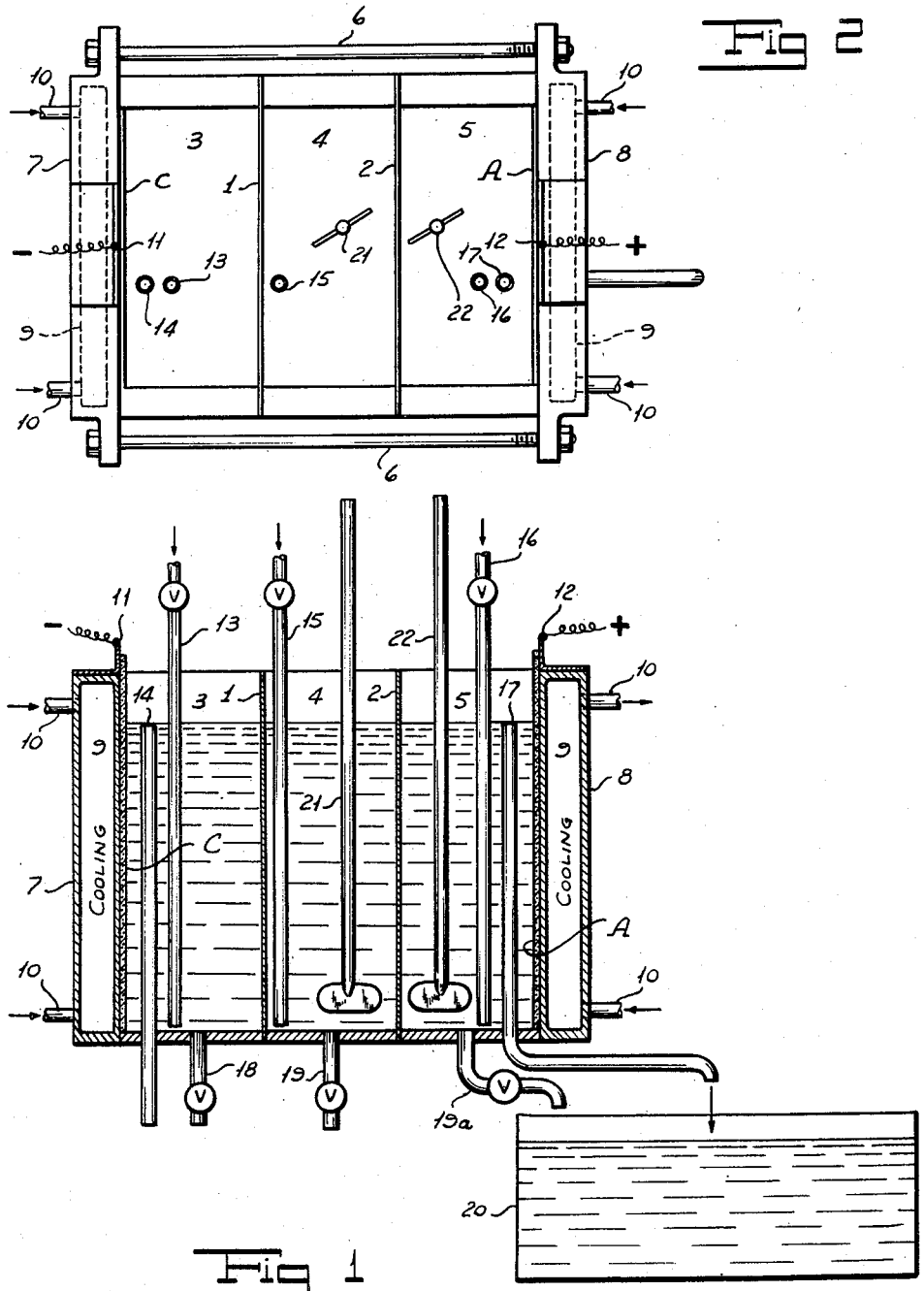

2,547,231

UNITED STATES PATENT OFFICE 2,547,231

ELECTROOSMOTIC ISOLATION OF STREPTOMYCIN

Jack D. Sartakoff, Douglaston, N. Y., assignor of one-fourth to Roger Seligman, New York, N. Y.

Application March 10, 1948, Serial No. 14,056

4 Claims. (Cl. 204—180)

1

This invention relates to a process of and apparatus for isolating streptomycin. Various processes have heretofore been suggested for the isolation of streptomycin, but the following is typical:

An appropriate broth is fermented to produce a ferment having a pH of over 7. After being adjusted to between 2 and 3 pH by the addition of an appropriate acid, there is then added thereto activated carbon ("Norite A") in the amount of approximately 0.5% by weight, calculated on the volume of the fermented broth. After agitation, the broth is filtered, leaving as a residue a myselium and activated carbon (charcoal) to which is adsorbed streptomycin in amounts which frequently run between 15 and 20% of the streptomycin contents of the original ferment. This residue, which may be termed the "first residue," is discarded and thrown away and the residual streptomycin therein contained is lost. The filtrate includes the remainig streptomycin, water, organic and inorganic salts, proteins and impurities. This filtrate is adjusted to a pH of over 7, usually through the use of potassium hydroxide, and there is then added thereto approximately 1% of activated charcoal. After agitation, there follows another filtration step, which results in a "second residue," and filtrate which is discarded and thrown away. The second residue contains impurities, salts and streptomycin adsorbed by the charcoal.

Said second residue is first washed with distilled water and is thereafter passed through successive steps during which it is washed with ethyl alcohol and methyl alcohol and subsequently extracted through the use of methanolic hydrogen chloride of approximately 0.1 normal. This is followed by precipitation with ether to yield a crude streptomycin and the resulting extract is purified by additional purification steps.

I have discovered, as a result of protracted research and tests, that many of the separation and isolation steps of the foregoing specific and other prior processes may be dispensed with and a greater end product yield of streptomycin obtained, by subjecting carbon to which streptomycin is adsorbed, to the novel electrolytic separation process hereinafter described. The fact that this carbon may or may not also contain or have associated therewith impurities or other extraneous matter will not affect the operativeness of this process.

For example, the hereinbefore referred to "first residue" or "second residue" may be first washed with distilled water and then subjected to the ac-

2 tion of an electric current within an electrolytic cell. When thus treated, the streptomycin, which is chemically basic, will go to the anode of the cell while practically all the impurities in the carbon or the associated myselium will either remain in suspension in the electrolyte in the cell or go to the cathode side. By virtue of this phenomenon, the streptomycin may be drawn off from the anode side of the cell in a relatively pure state, in water solution and in relatively concentrated form. I have produced concentrations greatly in excess of that of the original broth. A small percentage of impurities may be carried off with the streptomycin, but these may be readily subsequently removed by precipitation or otherwise.

An important feature of this invention is that the electrolytic isolation referred to is extremely efficient and results in a much higher yield of streptomycin than has heretofore been possible of attainment. Furthermore the process may be utilized at various points in separation and isolation steps of prior processes to minimize the number of steps heretofore required and it may be duplicated or repeated at different steps or stages or after different filtering operations. An important advantage is that it is operative at practically any stage after the fermentation step of the broth though I find it convenient to at least filter the broth once before subjecting the residue of that filtration step to the electrolytic step of this invention. I have found it entirely practical to take the "first residue" and subject it to the electrolytic step of this process, separately subject the second or some subsequent residue to the electrolytic step thereof, and thereafter mix the resulting end products for a simultaneous or collective treatment, either through a repetition of the electrolytic step or by appropriate precipitation steps well known to the art. By practising the electrolytic step of this invention with respect to relatively crude starting material, such as that of the first residue referred to, which heretofore has been thrown away, it is possible to recover a very appreciable portion of the residual streptomycin thereof which heretofore has been lost.

I have found that the method of this invention may be most efficiently and effectually carried out in the electrolytic cell hereinafter described. This cell is divided internally into three chambers separated from one another by osmotic diaphragms. By preference I place the material (i. e., the streptomycin-adsorbed carbon) to be treated in a center chamber of the cell between the two diaphragms and use, as an electrolyte, acidified distilled water. During the electrolytic step the electrolyte is maintained at all times on the acid side, either by adding further electrolyte from time to time or further acid (e. g., hydrochloric or sulphuric) as may be necessary.

If desired the solution in the chamber adjacent the anode of the cell may be drawn off from time to time as it contains or nears approximately 1% or 2% streptomycin saturation and this drawing off may be accomplished by overflow, while distilled water to displace it is fed into the anode chamber. The cell may be provided with agitators. These agitators are particularly desirable in some instances in the anode chamber to keep concentration therein substantially uniform throughout this chamber and agitation is also preferably in many instances in the center compartment of the cell to maintain the carbon and adsorbed material in suspension in the electrolyte.

In practically carrying out this invention considerable heat may be generated and it is therefore desirable, as hereinafter more fully explained, to cool the anode and cathode cells.

Furthermore I have found that a very satisfactory cell for this purpose may be made by coating the opposite walls of the cell, i. e., the anode and cathode walls, with coatings of graphite which serve as the anode and cathode plates of a cell. The method of applying these graphite coatings is novel. It is highly important from a practical standpoint because such graphite coatings are chemically inert and will not affect or be appreciably affected by the action in the cell. The terminals of these electrodes are attached thereto as hereinafter more fully explained.

Features of the invention, other than those adverted to, will be apparent from the hereinafter detailed description and appended claims when read in conjunction with the accompanying drawing.

In the accompanying drawing, I have shown by way of illustration one form of my cell which has proven highly efficient in the carrying out of this invention. This cell is shown in the drawing in diagrammatic manner.

Figure 1 shows the cell in diagrammatic vertical section.

Figure 2 is a plan view.

The cell shown in the drawings is made up of a plurality of sections placed end to end with osmotic diaphragms 1 and 2 dividing the interior of the cell into three separate compartments 3, 4 and 5. These diaphragms are shown as interposed between adjacent sections and clamped in place, when the sections are assembled, by tie rods 6. The section 7 at the left hand end of the cell, as shown in the drawings, constitutes the cathode section, while the section 8 at the opposite end of the cell constitutes the anode section. These two sections are both made hollow to provide internal jackets 9 through which a cooling fluid, such as water, may be circulated through pipes 10, so as to maintain the anode and cathode sections at optimum operating temperatures.

The inner surfaces of both the anode and cathode sections are faced with an appropriate conductive material to form the anode A and cathode C. I have found that it is highly practical and efficient, in the manufacture of this cell, to coat these inner surfaces with a substantially inert organic plastic, such as polystyrene and before the plastic is set to sprinkle over the surface of the plastic finely divided graphite. As the plastic sets or hardens, this graphite becomes adhered thereto and forms over these surfaces, a substantially continuous chemically resistant conductive coating the upper portion of which extends into contact with a cathode terminal 11 and an anode terminal 12. Finely divided carbon may be used instead of graphite in this connection or slabs of carbon or graphite may be laminated against the inner surfaces of the sections 7 and 8, but the use of granular material, adhered as described, constitutes an extremely simple and economical method of producing a very satisfactory electrode.

The material to be treated in accordance with this invention is adapted to be fed into the center compartment 4 between the osmotic diaphragms 1 and 2, while all of the compartments are charged with electrolyte, preferably distilled water to which sufficient acid has been added to insure that the electrolyte is on the acid side.

Distilled water may be fed into the compartment 3 through an appropriate valved inlet pipe 13, while the maximum depth of the electrolyte is controlled by an overflow pipe 14 in this compartment. Distilled water may be fed into the center compartment 4 through a valved inlet pipe 15, while a valved inlet pipe 16 provides for the feeding of distilled water in the chamber 5, the latter of which has an overflow pipe 17. The chambers 3 and 4 have valved outlets 18 and 19, respectively, so that their contents may be drawn off when desired, while the chamber 5 has a valved draw off 19a, preferably leading to a tank 20, to which the overflow 17 of this chamber also leads. An agitator 21 is provided in the center compartment 4 while another agitator 22 is provided in the compartment 5. These agitators may be mechanically operated in any suitable manner to keep the contents of these chambers in suspension or solution.

The material to be processed in accordance with this invention is introduced into the center compartment 4 in the presence of an electrolyte to fill the cell to the overflow pipes and current is thereupon passed through the cell. I have successfully operated this cell with 110 volts and from 0.5 to 5 amperes. I have usually maintained a pH of approximately 2 to 4.9 in the center compartment, a pH above 2 in the compartment 3, and a pH of between 3 and 12.6 in the compartment 5.

As the cell functions, the streptomycin being ionically negative, passes through the diaphragm 2 into the anode compartment 5, while the ionically positive constituents in the compartment 4 pass through the diaphragm 1 into the cathode compartment. As the operation continues and the concentration in the anode compartment increases to the neighborhood of pH 11.5, I have found it desirable to hold down this concentration so that it does not materially increase beyond this point. This is conveniently done by admitting distilled water through the valved inlet 16, causing an overflow through the pipe 17 to the tank 20. This overflow is found to contain streptomycin free of proteins and other extraneous materials and to be in relatively concentrated form. By proper feed of distilled water this concentration can be substantially maintained.

As the operation proceeds, the condition of acidity in the compartments 3 and 4 tends to decrease and acid may be added from time to time to maintain these compartments on the acid side. I have found that from 2 to 4.9 pH is an optimum acidity for the compartment 4 while the acidity for the compartment 3 shall be at least 2 pH. The electrolytic operation proceeds until practically all of the streptomycin in the compartment 4 has passed through the intermediate diaphragm 2 into the compartment 5. The contents of this latter compartment are then completely drawn off. The remaining material within the compartments 3 and 4 is evacuated, and the cell is recharged to repeat the operations described.

I have found it entirely practical to proceed as follows, namely: filter the broth and adjust the filtrate to approximately 7.3 pH. Then add to the filtrate sufficient activated charcoal to adsorb the streptomycin present in the filtrate. This will usually be approximately 1% of the streptomycin. The carbon with the streptomycin adsorbed thereto is then separated from the remainder of the filtrate by filtration, leaving the carbon with adsorbed streptomycin. This carbon is then preferably washed out with cold distilled water to eliminate impurities. This washing operation may, if desired, be carried on in the filter. There results carbon cake with adsorbed streptomycin to be recovered therefrom.

This streptomycin-adsorbed carbon is then mixed with distilled water and stirred while acid is added thereto (e. g., hydrochloric to adjust the pH from 2 to 4 pH). The resulting material is then introduced into the center chamber 4 of the cell. The other two chambers of the cell are filled to the same level with distilled water, to which is preferably added a small amount of acid to render the electrolyte electrically conductive. Current may then be admitted to the cell to carry out the electrolytic separation as hereinbefore described.

I have found it desirable to start with a relatively low amperage, such, for example, as one-half ampere and 110 volts and to increase the amperage gradually up to about 4 amperes as the action proceeds for I find that the separation of the streptomycin increases as the amperage increases as indicated. The advantage of using low amperage is that it generates less heat and does not require such degree of cooling as would otherwise be necessary.

In carrying out the method of this invention, it is desirable to maintain fairly close supervision over the electrolyte in the several chambers of the cell. For instance, the middle cell may, to advantage, be maintained at between 2-4 pH. In the cathode chamber 3, the pH should be maintained at not less than 2 and when this minimum pH is reached distilled water should be added as hereinbefore described. In the anode chamber 5, the pH may be allowed to go up to 12.6. I have operated very satisfactorily with the pH in this chamber at 11.6. The pH may be regulated in this chamber as desired by the addition of acid or the admission into this chamber of distilled water as may be necessary.

In any event, the end product of the process or method of this invention, which is drawn off into the tank 20, constitutes a relatively high concentration of pure streptomycin in water. It is found that this concentrate is substantially free from proteins which are undesirable. This concentrate may be further refined or concentrated in any one of many different ways. For example, it may be adsorbed again on carbon and extracted in any appropriate manner or this concentrate may be evaporated by any one of several well known processes to produce streptomycin as a dry, powdered end product.

The foregoing detailed description sets forth the invention in its preferred practical form, but the invention is to be understood as fully commensurate with the appended claims.

Having thus fully described the invention, what I claim as new and desire to secure by Letters Patent is:

1. The method of isolating streptomycin which comprises: introducing an aqueous suspension of carbon with adsorbed streptomycin thereon into the center chamber of an electrolytic cell equipped with osmotic diaphragms spaced from one another and arranged between and in spaced relation to a carbonaceous anode and a carbonaceous cathode, introducing acidified water into the anodic and cathodic chambers of said electrolytic cell, passing through the cell electric current of about 110 volts and from 0.5 to 5 amperes, maintaining said suspension in said center chamber at pH 2 to pH 4.9, and drawing off water and streptomycin solution from the anodic chamber as the concentration of the streptomycin therein is increased.

2. Method as claimed in claim 1 which includes the step of cooling the contents of the cell during passage of the current therethrough to preclude overheating and consequent inactivation of the streptomycin.

3. Method as claimed in claim 1 which includes the additional step of agitating the contents of the center chamber during the passage of electric current through the cell.

4. Method as claimed in claim 1 which includes the steps of agitating the contents of the center chamber, and cooling the contents of the entire cell during the passage of current therethrough to preclude overheating and resulting inactivation of the streptomycin.

JACK D. SARTAKOFF.

REFERENCES CITED

The following references are of record in the file of this patent:

UNITED STATES PATENTS

| Number | Name | Date |
|---|---|---|
| 1,235,063 | Schwerin | July 31, 1917 |
| 1,711,416 | Lapenta | Apr. 30, 1929 |
| 1,889,779 | Ebert et al. | Dec. 6, 1932 |
| 1,942,478 | Jenny | Jan. 9, 1934 |
| 1,955,237 | Jenny | Apr. 17, 1934 |
| 2,277,091 | Feyens | Mar. 24, 1942 |
| 2,461,922 | Rake et al. | Feb. 15, 1949 |

OTHER REFERENCES

Carter et al.: Journal of Biological Chemistry, vol. 160 (1945), pp. 337-342.